(12) United States Patent
Chernick et al.

(10) Patent No.: US 11,848,953 B1
(45) Date of Patent: Dec. 19, 2023

(54) NETWORK COMPROMISE ACTIVITY MONITORING SYSTEM

(71) Applicant: Celerium Inc., Torrance, CA (US)

(72) Inventors: Aubrey Grant Chernick, Los Angeles, CA (US); Vincent Owen Crisler, Alexandria, VA (US)

(73) Assignee: Celerium Inc., Torrance, CA (US)

( * ) Notice: Subject to any disclaimer, the term of this patent is extended or adjusted under 35 U.S.C. 154(b) by 0 days.

(21) Appl. No.: 18/111,351

(22) Filed: Feb. 17, 2023

(51) Int. Cl.
*H04L 9/40* (2022.01)
(52) U.S. Cl.
CPC ...... *H04L 63/1425* (2013.01); *H04L 63/0236* (2013.01); *H04L 63/1416* (2013.01)
(58) Field of Classification Search
CPC ............. H04L 63/1425; H04L 63/0236; H04L 63/1416
USPC ......................................................... 726/23
See application file for complete search history.

(56) References Cited

U.S. PATENT DOCUMENTS

| | | | | |
|---|---|---|---|---|
| 8,250,624 | B2 * | 8/2012 | Lamotte | H04L 63/164 726/1 |
| 10,735,455 | B2 * | 8/2020 | Crisler | H04L 63/1408 |
| 2007/0261112 | A1 * | 11/2007 | Todd | H04L 63/1483 726/2 |
| 2009/0249472 | A1 * | 10/2009 | Litvin | H04L 63/0263 726/14 |
| 2010/0251363 | A1 * | 9/2010 | Todorovic | G06F 21/56 718/1 |
| 2012/0102568 | A1 * | 4/2012 | Tarbotton | G06F 21/552 726/23 |
| 2013/0103834 | A1 * | 4/2013 | Dzerve | H04L 67/10 709/225 |
| 2016/0036838 | A1 * | 2/2016 | Jain | H04L 63/1416 726/23 |
| 2019/0213325 | A1 * | 7/2019 | McKerchar | G06F 21/51 |
| 2019/0268317 | A1 * | 8/2019 | Haelion | H04L 63/0435 |
| 2020/0120121 | A1 * | 4/2020 | Aggarwal | H04W 88/16 |
| 2022/0131835 | A1 * | 4/2022 | Fenton | H04L 63/1458 |

OTHER PUBLICATIONS

DoD Zero Trust Strategy, Department of Defense, Oct. 21, 2022, Cleared for Open Publication Nov. 7, 2022, Office of Prepublication and Security Review.
IBM/Ponemon Institute. report entitled "Cost of a Data Breach Report 2022", IBM Corporation, Jul. 2022.

* cited by examiner

*Primary Examiner* — Badri Narayanan Champakesan
(74) *Attorney, Agent, or Firm* — Michael Bednarek; BEDNAREK LEGAL, PLLC

(57) ABSTRACT

A network compromise activity monitoring system includes a network connector, a compromise activity analyzer, and a compromise defender. The network connector has a public network port, at least one private network port, and an associated network connector traffic log concerning data packet traffic of the network connector. The compromise activity analyzer has access to suspect destination metadata, egress traffic metadata, and network device metadata, and is operative to determine a compromise activity level of one or more devices coupled to the at least one private network port. The compromise defender is responsive to the determined compromise activity level of the one or more devices and is operative to at least one of block, alert and notify in accordance with at least one rule.

29 Claims, 11 Drawing Sheets

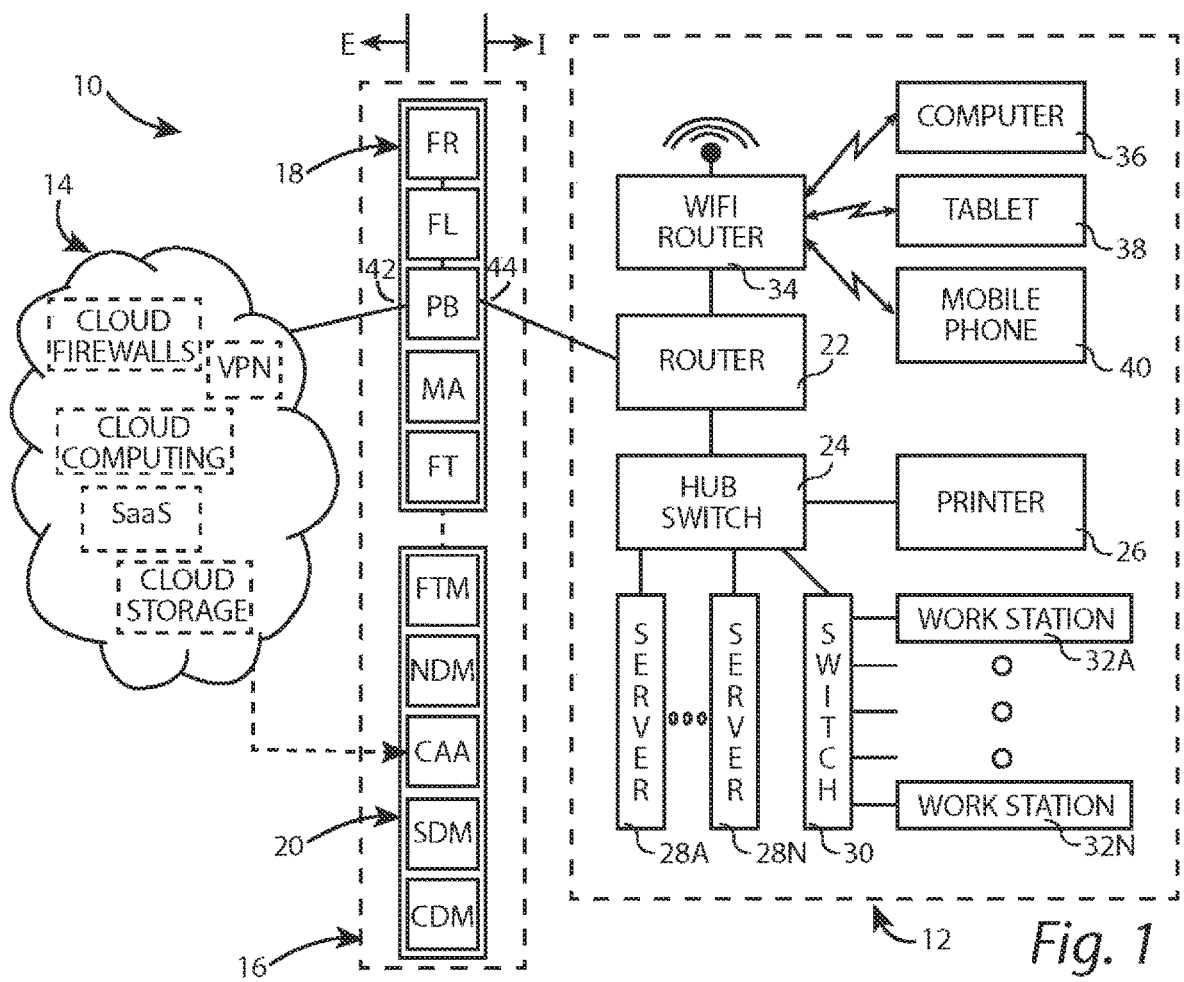

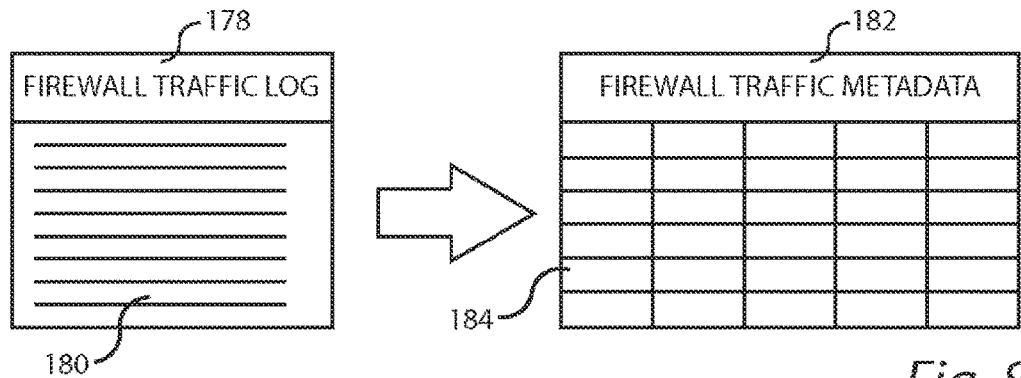
Fig. 8
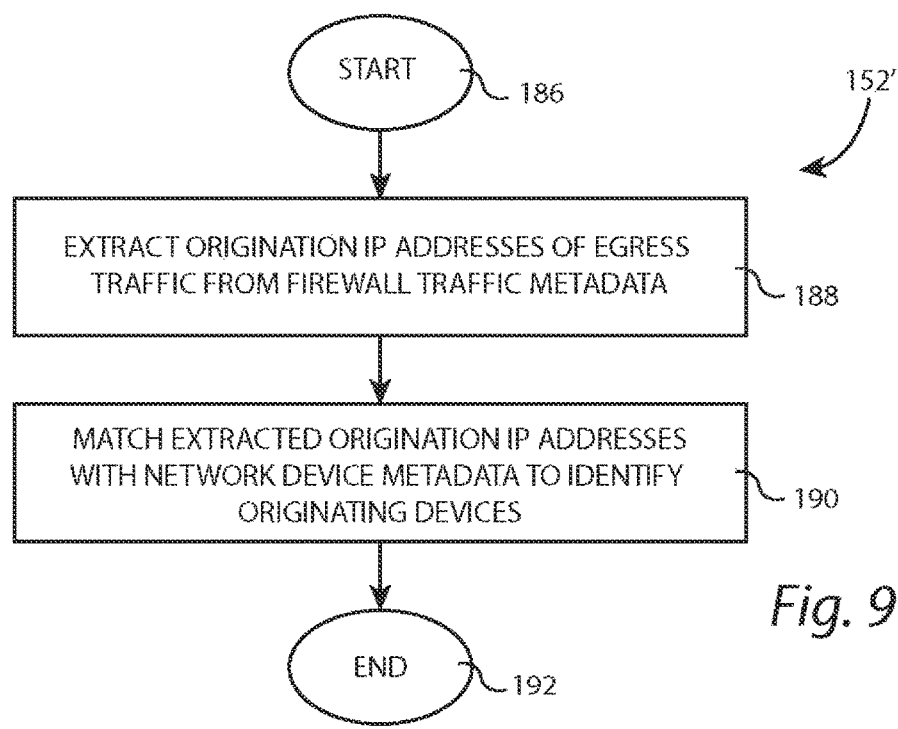
Fig. 9
Fig. 10

| Communication of Concern | |
|---|---|
| Starting Score | 50 |
| Host Sensitivity | 75 |
| Destination Host | 112.5 |
| Port Criticality | 123.75 |
| Final | 123.75 |

↳ 218

| Factor | Value | Result |
|---|---|---|
| Host Sensitivity | High | 0.5 |
| Destination Host Score | 9 | 0.5 |
| Port Criticality | High | 0.1 |
| Count | 1,000 | 80 |
| Data Volume | 100,000 | 50 |

↳ 220

| Min Score | 23.75 |
|---|---|
| Max Score | 125.75 |
| Normalized Score | 100.00 |

↳ 222

| Count Adjustment | 80.00 |
|---|---|
| Data Volume Adjustment | 50.00 |
| Max | 80.00 |
| Compromise Concern | 86.67 |

↳ 224

| Host Sensitivity Multiplier | |
|---|---|
| Low | 0% |
| Medium | 25% |
| High | 50% |

↳ 212

| Destination Host Score Factor | |
|---|---|
| 1 | -50% |
| 2 | -30% |
| 3 | -20% |
| 4 | -10% |
| 5 | 0 |
| 6 | -10% |
| 7 | -20% |
| 8 | -30% |
| 9 | -50% |

↳ 214

| Port Criticality Factor | |
|---|---|
| Low | -5% |
| Medium | 5% |
| High | -10% |

NETWORK PORT METADATA ↳ 228

NETWORK COMPROMISE ACTIVITY MONITORING SYSTEM

BACKGROUND

Computers and networks of computers are coming under increasingly sophisticated attacks by entities (often referred to as "hackers") who gain unauthorized access to computers and/or network devices. More specifically, hackers access devices such as computers, smartphones, tablets, and network devices without authorization, often to cause damage, corrupt systems, steal data, hold data hostage, or otherwise limit access to these devices by authorized users. The tool, tactics, techniques, and procedures of hackers are rapidly growing in sophistication, enabling activities from initial compromise, command and control, persistence, and data exfiltration to go unnoticed by cybersecurity and IT teams and the traditional tools they utilize. Hackers are skilled in creating attack vectors that trick employees and individual users into opening malicious attachments or links and freely giving up sensitive personal or company data or user credentials. Attack vectors include sharing malware and viruses, malicious email attachments and web links, phishing, pop-up windows, text messages, and instant messages.

Malware is any software that is intentionally designed to cause disruption to a computer, server, client or computer network, leak private information, gain unauthorized access to information or systems, deprive access to information, or which unknowingly interferes with a user's computer security and privacy. Types of malware include computer viruses, worms, Trojan horses, ransomware, spyware, adware, rogue software, wiper and keyloggers.

Traditional defense strategies against hacking and malware include the use of network firewalls, end point agents to detect malware and viruses, and the collection of log data for aggregation into security information and event management (SIEM) tools. Antivirus and antimalware software attempts to identify viruses or malware, typically by a known hash tag or signature that is designed to detection behaviors related to hacking behaviors. However, these software rely on the maintenance and constant update of a database of detection capabilities as ever more sophisticated, malware is developed. The use of such software is increasingly limited by the ability of hackers to use the same tools to test their malicious code against to determine if their code or techniques will evade detection. In contrast, a firewall is a security system that monitors and controls incoming (ingress) and outgoing (egress) network traffic based on predetermined security rules. Some firewalls also have the ability to perform analysis on network traffic to identify malicious files or unauthorized user activity. However, these methods tend to require well-trained security teams to review and process alerts to separate real attacks from false positives. A firewall establishes a security barrier between a trusted ("private") device or network of devices and an untrusted ("public") network, such as the Internet. However, a firewall cannot prevent all attempted hacks, due to hackers increasingly using encrypted channels of communication that cannot be analyzed without more advanced traffic inspection capabilities.

Various types of network monitoring tools that are used to collect and analyze data about network activity. Among these are "Syslog" and "NetFlow." While these tools serve similar purposes, there are some key differences between them. Syslog is a standard protocol used for forwarding system log messages from one device to another. It is primarily used for collecting log data from various network devices, such as routers, switches, and servers. Syslog messages contain information about events that occur on the device, including security alerts, system errors, and other messages. The data is stored in text files and can be analyzed using various tools.

NetFlow, on the other hand, is a network protocol developed by Cisco that is used for traffic analysis and network monitoring. It collects and records information about network traffic flows, including the source and destination addresses, the type of traffic, and the amount of data transferred. NetFlow is used to identify network usage patterns, monitor network performance, and detect security threats.

In terms of similarities, both Syslog and NetFlow are used to collect and analyze data about network activity, and both are widely used in network monitoring and management. They provide valuable insights into network performance, security, and usage patterns. However, the main difference between the two is that Syslog focuses on collecting log data, while NetFlow is focused on network traffic analysis. Both Syslog and NetFlow are important tools for network monitoring and management, but they serve different purposes. Syslog is used to collect log data from network devices, while NetFlow is used to analyze network traffic flow.

There are many alternatives to Syslog and NetFlow for network monitoring and management, each with its own strengths and weaknesses. These include sFlow; Simple Network Management Protocol (SNMP); ELK Stack; Graylog; and Wireshark. The choice of tool will depend on the specific needs of the organization, the type of network being monitored, and the level of detail required for analysis.

The term "initial access" refers to when a hacker (a/k/a intruder, threat actor, etc.) bypasses network defense measures and enters a computer network or computer system. Initial access can also be achieved with the introduction of malware into a computer via a thumb drive or flash drive. A number of tools have been developed that attempt to detect, prevent and/or block access based on network activity including Intrusion Detection Tools and firewalls (IDS), Intrusion Prevention tools and firewalls (IPS), Malware defenses (e.g., anti-malware, anti-virus), Endpoint Detections and Response (EDR), Managed Detection and Response (MDR), etc. These protective measures, which tend to focus on the network or perimeter, may not be sufficient to detect, prevent or remediate initial access. Hackers that successfully achieve initial access to computer networks and/or computer systems are considered to be intruders or "threat actors." Increasingly industry groups and experts are of the belief that the protective measures (network or perimeter, and other measures) of prior art tools are not sufficient to ensure the safety of a private network.

The Department of Defense (DOD) cleared a document for open publication on Nov. 7, 2022, relating to their "Zero Trust Strategy" which assumes "threat actors" may already be in a network system, computer or device. DoD Zero Trust Strategy, Department of Defense, Oct. 21, 2022, Cleared for Open Publication Nov. 7, 2022, Office of Prepublication and Security Review. This suggests the need for a whole new body of solutions to understand and deal with intruders.

The topic of data breaches has been researched by many organizations including IBM/Ponemon Institute for a number of years. In a report entitled "Cost of a Data Breach Report 2022", IBM Corporation, July 2022, IBM/Ponemon Institute suggest that the average time to detect data breaches is 207 days. They note that when assessing the damage caused by a data breach, the duration of the data breach must also be considered. Unfortunately, efficient and effective solutions to providing early detection of a data breach or other network system compromise have remained elusive in the prior art.

These and other limitations of the prior art will become apparent to those of skill in the art upon a reading of the following descriptions and a study of the several figures of the drawing.

SUMMARY

A network compromise activity monitoring system includes a network connector, a compromise activity analyzer, and a compromise defender. The network connector has a public network port, at least one private network port, and an associated network connector traffic log concerning data packet traffic of the network connector, whereby data packets flowing into the at least one private network port and out of the public network port are egress traffic and wherein data packets flowing into the public network port and out of the at least one private network port are ingress traffic. The compromise activity analyzer has access to suspect destination metadata, egress traffic metadata, and network device metadata, and is operative to determine a compromise activity level of one or more devices coupled to the at least one private network port, based at least in part, upon the suspect destination metadata, the egress traffic metadata, and the network device metadata. The compromise defender is responsive to the determined compromise activity level of the one or more devices and is operative to at least one of block, alert and notify in accordance with at least one rule.

A network device compromise activity analyzer includes: a processor; and memory coupled to the processor having code segments executable on the processor for (a) retrieving firewall traffic metadata including at least egress traffic metadata having origination Internet Protocol (IP) addresses and destination IP addresses of egress traffic of a firewall; (b) matching origination IP addresses of the egress traffic metadata with network device metadata to identify at least one originating device of the egress data packets; (c) matching destination IP addresses of the egress traffic metadata with suspect destination metadata to identify suspect destinations of the egress data packets; (d) determining a compromise activity level with respect to the at least one originating device based upon the egress traffic metadata, the network device metadata, and the suspect destination metadata; and (e) acting upon determined compromise activity levels in accordance with at least one rule.

A computer-implemented method for monitoring compromise activity of a network device includes: providing firewall traffic metadata to a compromise activity analyzer including a digital processor and memory, wherein the firewall traffic metadata includes at least egress traffic metadata having origination Internet Protocol (IP) addresses and destination IP addresses of egress traffic of the firewall; matching origination IP addresses of the egress traffic metadata with network device metadata to identify at least one originating device of the egress data packets; matching destination IP addresses of the egress traffic metadata with suspect destination metadata; determining a compromise activity level to the at least one originating device based upon egress traffic metadata, the network device metadata and the suspect destination metadata; and acting upon determined compromise activity levels in accordance with at least one rule.

A non-transitory computer readable media including code segments executable on a digital processor for monitoring compromise activity of a network device having: code segments providing firewall traffic metadata including at least egress traffic metadata with origination Internet Protocol (IP) addresses and destination IP addresses of egress traffic of a firewall; code segments matching origination IP addresses of the egress traffic metadata with network device metadata to identify at least one originating device of the egress data packets; code segments determining a compromise activity level to the at least one originating device based upon egress traffic metadata and the network device metadata; and code segments acting upon determined compromise activity levels in accordance with at least one rule.

An advantage of example embodiments is that compromises of network devices such as servers and computers can be detected in a timely fashion by an examination of traffic transiting the network connector, one representation of which is a firewall.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 1 is a block diagram of a first example public/private network system with a network compromise activity analyzing system;

FIG. 2 is a block diagram of an example computer platform of the network compromise activity analyzing system;

FIG. 8 is an illustration of an example firewall traffic log file and firewall traffic metadata table;

FIG. 9 is a flow diagram of an example process for matching origination IP addresses of egress traffic metadata with network device metadata;

FIG. 10 is an illustration of an example network device metadata table;

FIG. 13 is an illustration of an example methodology for determining a compromise activity level;

FIG. 14 is an illustration of a network port metadata table;

DETAILED DESCRIPTION OF EXAMPLE EMBODIMENTS

Figure 3:
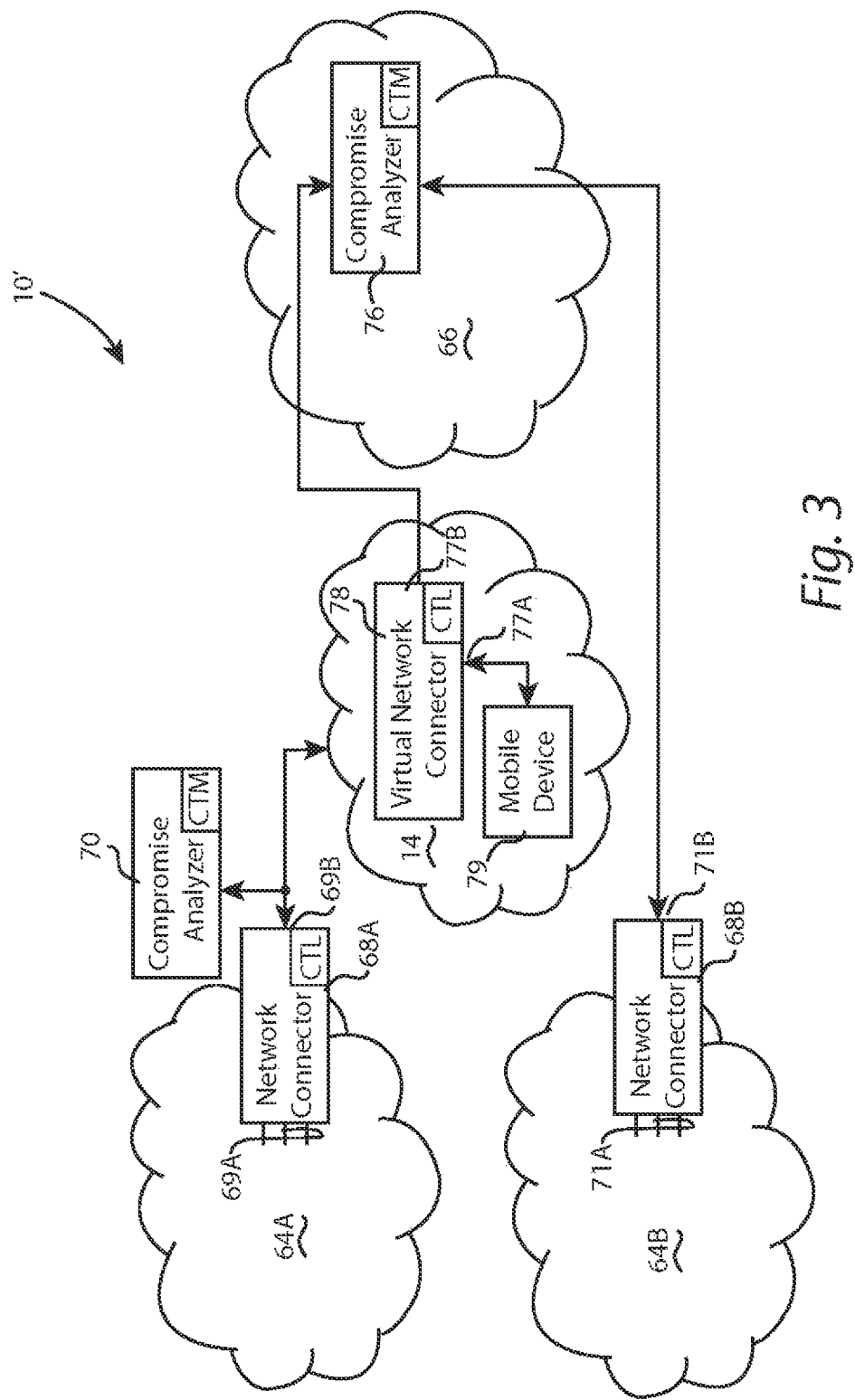
FIG. 3 is a block diagram of a second example public/private network system including multiple network compromise activity analyzing systems.

In FIG. 1, an example network system 10 includes a private network 12, a public network 14, and a network compromise activity analyzing system 16. In this example, the private network 12 is a local area network (LAN) of, for example, a private business, and the public network 14 is a wide area network (WAN), such as the Internet. The public network 14 can provide a number of cloud services such as cloud firewalls, virtual private networks (VPNs), could computing, software as a service (SaaS), cloud data storage, etc. The network compromise activity analyzing system 16, also in this example, includes a firewall 18, a compromise activity analyzer 20 an integrated compromise defender module CDM. In other embodiments, the CDM can be separate from the compromise activity analyzer 20, e.g., provided as Software as a Service (SaaS) on Internet 14.

Communication between devices of the network system 10 comprise digital data packets having headers (and sometimes trailers and/or footers) which provide information about the data packet's contents, origination and destination. For example, an Internet Protocol (IP) packet has a header that contains information about where a packet is from (its source IP address), where it is going (destination IP address), how large the packet is, and how long network routers should continue to forward the packet before dropping it. It may also indicate whether or not the packet can be fragmented and include information about reassembling fragmented packets.

Private network (LAN) 12, in this non-limiting example, includes a number of devices including a router 22, a hub switch 24, a printer 26, a number of servers 28A-28N, a switch 30, a number of workstations 32A-32N, a WiFi router 34 and three example WiFi enabled devices such as computer 36, tablet 38 and mobile phone 40. Each of the devices of example LAN 12 has an assigned Internet Protocol (IP) address, some of which may be static and some of which may be dynamic. For example, WiFi connected devices such as computer 36, tablet 38 and mobile phone 40 may be assigned a dynamic IP address as they connect to the WiFi router 34, while the servers 28A-28N may be assigned static IP addresses. The various devices of private network 12 can generally communicate freely within the private network and can communicate with the public network 14 via firewall 18.

In this example, the firewall 18 is a commercially available hardware firewall available from a number of manufacturers including Cisco Systems, WatchGuard, Fortinet and Barracuda Networks. In alternate embodiments, firewall 18 can be implemented as software running on a server, computer, or in the Cloud (e.g., in a cloud firewall on Internet 14). Firewall 18 includes a number of modules including a packet blocking (PB) module to block certain data packets, a firewall logic (FL) module to control the PB module, a firewall rules (FR) module used by the FL module, a masking (MA) module to mask the IP addresses of devices connected to the private LAN 12, and firewall traffic log (FT) module. In other examples, a firewall can comprise any hardware or virtual networking device that has a public network port and at least one private network port.

An important purpose for the firewall 18 is to prevent the transfer of malicious code or unauthorized data between the private LAN 12 and the public WAN 14. It accomplishes this in a number of ways. For one, the MA module can mask the IP addresses of the devices of LAN 12 from the public network, typically using a process known as network address translation (NAT). This process results in devices on the LAN being assigned private IP addresses instead of publicly addressable IP addresses. This often presents a challenge to security analytics tools as the same private IP address may be utilized by millions of devices globally. Also, the FL module inspects data packets for source and destination IP addresses, port numbers, type, etc. and uses a set of rules from the FR module to stop certain data packets with the packet blocking module PB from being transferred from the WAN to the LAN and potentially vice versa.

The example firewall 18 of FIG. 1 is illustrated with a public network port 42 coupled to the WAN 14 and a private network port 44 coupled to the LAN 12. The public network port 42 and the private network port 44 are typically Input/Output (I/O) ports adhering to the IEEE 802.3 standard and are commonly referred to as Ethernet ports. Other firewalls have different configurations of I/O ports, e.g., many hardware firewalls have a number of private network ports to supplement or replace the need for router 22. As noted, not every data packet sent from WAN 14 to public network port 42 is allowed to pass through firewall 18 and enter the LAN 12. Furthermore, in some cases, not every data packet sent from LAN 12 to network port 44 is allowed to pass through the firewall 18 and enter the WAN 14. The FR module generally includes a rules table which governs which data packets are allowed to flow through the firewall and which packets are to be blocked.

As noted above, firewall 18 includes a FT module which at least temporarily stores log data concerning data packet traffic, referred to herein as "firewall traffic" or "FT" on FIG. 1 in order to facilitate ongoing exchanges between devices of LAN 12 and devices of WAN 14. Data packets leaving port 42 for WAN 14 are referred to herein as "egress data packets" or the like and are labelled "E" on FIG. 1 and data packets leaving port 44 for LAN 12 are referred to herein as "ingress data packets" or the like and are labelled "I" on FIG. 1. The egress data packets will have a masked version of the LAN device IP address as the origination of the packet and the IP address of the device on WAN 14 to which it is travelling. Conversely, ingress data packets will have the IP address of the device on the WAN 14 as its origin, and a masked version of the LAN device IP address to which it is travelling.

The compromise activity analyzer 20 is a digital logic system including, in the present example, a processor and memory with a firewall traffic metadata (FTM) module, a network device metadata (NDM) module, a compromise activity analysis (CAA) module, a compromise defender module (CDM) module, and a suspect destination metadata (SDM) module. The FTM module derives its data from the FT module of the firewall 18, either by direct communication with the firewall 18, e.g., via an Ethernet connection, or by indirect communication, e.g., via the WAN 14, as indicated by broken lines. The NDM module can optionally store the network device metadata in content-addressable format such as content-addressable memory (CAM) so that metadata for a device can be retrieved by the IP address of the device. The CAA module uses metadata from the FTM module and the NDM module to assign a device compromise index (DCI) to various servers, computers, and other devices of the private network 12. The CDM module uses the DCI of the network devices to take appropriate actions to address the threats of system compromise. While the CDM module forms a part of the compromise activity analyzer 20 in this embodiment, it can also be a separate module in communication with the compromise activity analyzer. The SDM module includes IP addresses of suspect destinations, along with metadata including threat levels, type of threat, etc. The SDM metadata can be supplemented from a variety of sources, including databases provided in public network 14.

It will be noted that the compromise activity analyzer 20 uses metadata from several sources including egress traffic metadata, network device metadata, and suspect destination metadata. As well known to those of skill in the art, metadata is data that describes other data, such as describing the origin, structure and characteristics of data packets, devices, network endpoints, etc. The form that metadata takes can vary, although it is often in the form of a file, array, table or list. For example, the egress traffic metadata can be derived from the packet headers of egress traffic, e.g., IP address of source, IP address destination, packet importance, packet size, port numbers, etc. The network device data is conveniently created as a table, sometimes referred to herein as a Compromise Translation Table (CTT), and includes such fields as IP Address(es), MAC Address(es), Private Port #, Device Name, Function, Vulnerabilities, User, Groups, etc. The suspect destination metadata can also be arranged as a table, with IP Address(es) of known bad actors, the type of threat associated with the IP Address(es), the severity of the threat, etc. The various metadata structures can be conveniently stored in Content Addressable Memory (CAM), such as CAM 53 of FIG. 2. By storing, for example, the suspect destination metadata in CAM, each destination address of the egress traffic can quickly search the suspect destination metadata (which can include thousands of IP addresses) for a match. Other search and metadata data structures are well known to those of skill in the art.

In FIG. 2, another implementation of compromise activity analyzer 20, set forth by way of example and not limitation, includes a local bus 46 and a Central Processing Unit (CPU) 48 coupled to the local bus 46 by high-speed Static Random Access Memory (SRAM) cache memory 50. Dynamic Random Access Memory (DRAM) primary or "main" memory 52 is coupled to cache memory 50 and to the bus 46. Content Addressable Memory (CAM) 53 or other content-searchable data storage may also be provided in certain embodiments. Basic Input/Output System (BIOS) 54 is coupled to bus 46 and can be reset by power-on reset 56. The compromise activity analyzer 20 also includes non-volatile memory 58, such as "flash" memory or a hard drive, network interface 60, and other input/output (I/O) interfaces 62. It will be appreciated that this is only one suitable architecture for compromise activity analyzer. For example, the compromise activity analyzer 20 can be integrated into the firewall 18, be implemented on a server, or provided as a by cloud computing on Internet 14.

FIG. 3 illustrates an example network system 10' including a number of private networks 64A, 64B, and 66, a public network (e.g., the Internet) 14. Private networks 64A and 64B are, in this example, company intranets or the like, and network 66 is a service provider network providing Software as a Solution (SaaS) services to customers. For example, service provider network 66 can provide network compromise activity monitoring for companies (a/k/a customers) associated with, for example, company network 64B and for a private virtual network on public network 14.

In this example, networks are coupled together by network connectors, or simply "connectors." The defining characteristics of a network connector is that it has one or more private network ports, a public network port, and the ability to provide data for a connector traffic log (CTL). For example, a network connector can provide Logging Protocol (Syslog) messages which are collected in a Syslog data structure. In addition, or alternatively Netflow data may be used.

There are a number of types of connectors that are suitable for use in network system 10'. The aforementioned firewalls are examples of network connectors, where firewall (connector) traffic log messages are stored in a Syslog, Netflow or other data structure to provide the basis for firewall (connector) traffic metadata. Another example of a connector is a network router having a public network port and one or more private network ports along and having router traffic metadata collection capabilities. Therefore, as used herein, a "network connector" or simply "connector" is defined as a network device having a public network port, one or more private network ports, and the ability to provide connector traffic messages or logs (CTL).

In this example, private network 64A includes a network connector 68A (including a CTL module) having one or more private network ports 69A coupled to devices of network 64A and a public network port 69B coupled to a compromise analyzer 70 and to the public network 14. This configuration is similar to that shown in FIG. 1, where the compromise analyzer 70 (including a CTM module) can be physically located near or within the network connector 68A or can be located remotely, e.g., as a real or virtual device on the public network 14.

Also, in this example, private network 64B includes a network connector 68B (including a CTL module) having one or more private network ports 71A coupled to devices of private network 64B and a public network port 71B coupled to the public network 14 and to a compromise analyzer 76 (including a CTM module) of service provider network 66. Also coupled to compromise analyzer 78 is a public network port 77B of a virtual network connector 78 (including a CTL module), which has a private network port 77A. In this non-limiting example, private network port 77A is coupled to a mobile device 79 which can be monitored by compromise analyzer 76.

It will be appreciated that the example network compromise activity monitoring systems described herein have the advantage of detecting compromise activity that may take place before an actual breach of a private network system. An important source of information is the egress traffic metadata, which generally reflects the "Layer 3" or network layer of Internet data packets. In particular, Layer 3 is responsible for all packet forwarding between intermediate routers. While very useful information concerning compromise activity can be found in the egress traffic metadata alone, complementing this with network device metadata (e.g., the CTT table mentioned previously), and the suspect destination metadata substantially augments the detection process.

Compromise activity detection and analysis can monitor for potential indicators of a breach including:
   New communication patterns
   Communication with known threat hosts
   beaconing or call-back types of activities
   abnormal data flow to or from systems
   communication on non-standard ports
   interaction with new SaaS or Application Servers
   Command & Control activity
   new or abnormal interaction with Data Upload/Storage Hosts
   communication with an external server used to download Malware or download more Malware (bootstrapping Malware)—sometimes referred to as "call back systems"

communication with a threat actor who is conducting surveillance to determine network and system infrastructure and also to look for sensitive content (sometime referred to a communications with "command and control" systems (servers or a person using a laptop or desktop system)

planting code or Malware that could provide ongoing surveillance activity (keyloggers, Remote Access Trojan (RAT), etc.)

destruction of data, encryption of data, theft or exfiltration of data

Hackers have a wide range of motivations ranging from the relatively benign (ego satisfaction, curiosity) to the more sinister. Early detection of hacking by detecting patterns of compromise activity can help prevent business compromise activities such as the following:

Potential "ransomware" activities

Potential Data Breach activities—used in some cases with ransomware

Potential data loss—example of sensitive business data or sensitive government data (classified, CUI, FCI)—used in some cases with ransomware Potential encryption of data—used in some cases with ransomware Potential destruction of data or systems ("Hactivists", or nation states attacking defense or critical infrastructure systems)

By way of example, abnormal communications can be detected over a period of time to detect changes from the "normal." For example, a device exhibiting a new pattern of communication or sudden high number of communications. Large data volume can be detected when volume of communication increases suddenly with an external host. For example, compromise activity may be detected when communication deviates from a historical norm, e.g., by two standard deviations. Port monitoring with suspect private network ports, such as port 3389 which is used for remote desktop control, can provide useful compromise activity information. Beaconing refers to periodic, routine communications between an internal host and an external host and is sometimes considered a marker for compromise activity.

Figure 4:
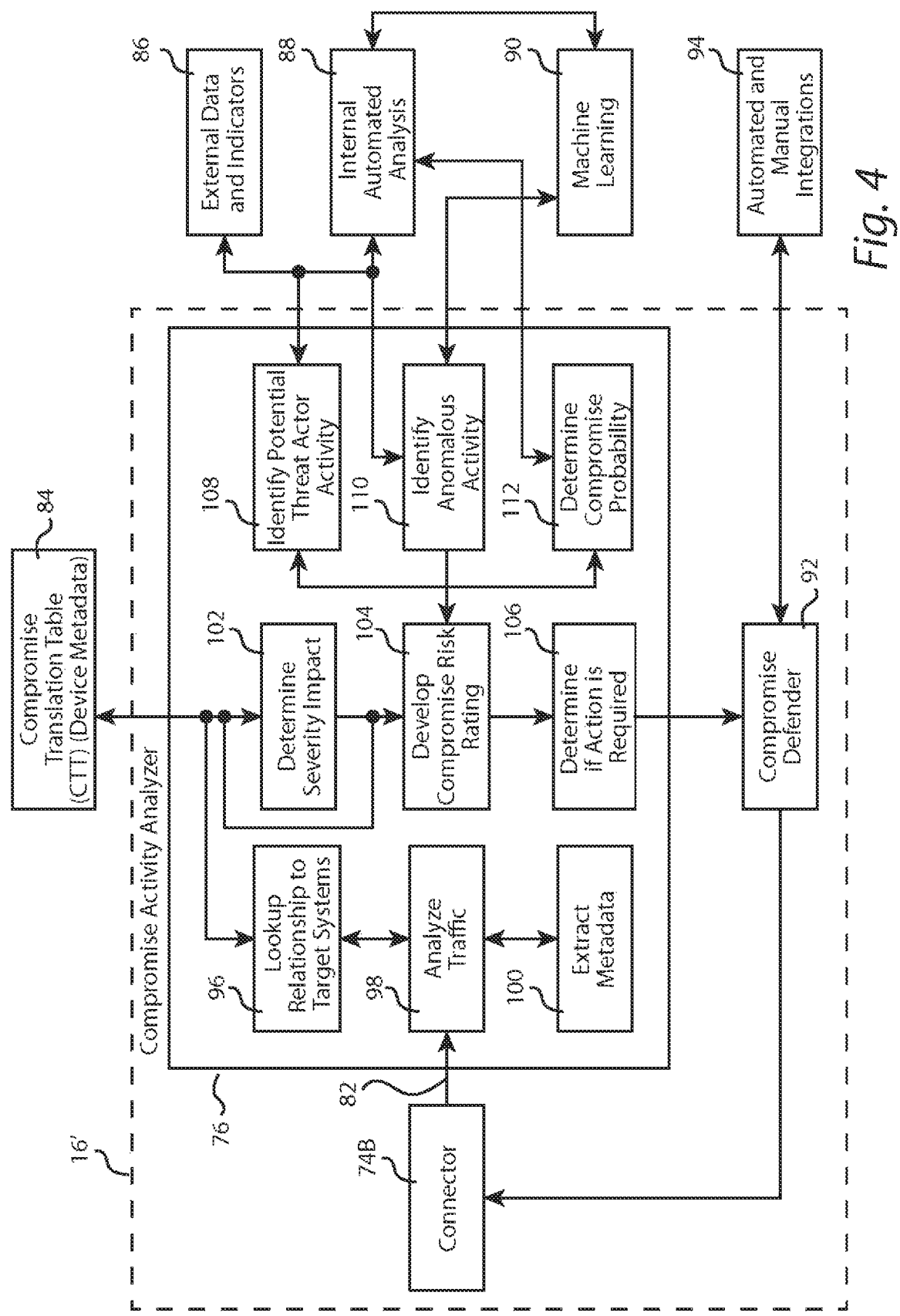
FIG. 4 is a block diagram of an example cloud-based network compromise activity analyzing system.

FIG. 4 is a block diagram of an example cloud-based network compromise activity analyzing system 16', including connector 74B and compromise activity analyzer 76. In this example, egress traffic data 82 from the connector 74B is input into the compromise activity analyzer 76 and is processed to determine compromise activity level of one or more devices on customer private networks. To accomplish this task, the compromise activity analyzer is coupled to a number of modules including a Compromise Translation Table (CTT) module 84 which includes network device metadata, External Data and Indicators module 86 which includes suspect destination metadata, Internal Automated Analysis module 88 which includes heuristic and statistical analysis, and Machine Learning module 90 which includes expert system and/or neural network analysis. Also shown in FIG. 4 is a Compromise Defender Module (CDM) 92 which is coupled to the compromise activity analyzer 76 and to the connector 74B. The CDM 92 is also coupled to an Automated and Manual Integrations module 94. It is noted that the CDM 92 is separate from the compromise activity analyzer 76 in this embodiment.

With continuing reference to FIG. 4, the example compromise activity analyzer 76 includes a Lookup Relationship to Target Systems module 96, an Analyze Traffic module 98, and an Extract Metadata module 100. These three modules analyze the egress traffic 82 from the connector 74B and develop egress traffic metadata used for further analysis. The example compromise activity analyzer 76 further includes a Determine Severity/Impact module 102, a Develop Compromise Risk Rating module 104, and a Determine if Action is Required module 106. These three modules analyze potential compromise activity based, at least in part, upon the device metadata received from CTT module 84, estimates the risk of the compromise activity, and determines if any deterrent action is required based upon predetermined heuristics. As will be explained in greater detail subsequently, if module 106 determines that action is required, Compromise Defender module 92 can come into play. Finally, the example compromise activity analyzer 76 further includes an Identify Potential Threat Actor Activity module 108, an Identify Anomalous Activity module 110, and a Determine Compromise Probability module 112. These modules communicate with modules 86-90 and provide an input to module 104 to develop a compromise risk rating.

Figure 5:
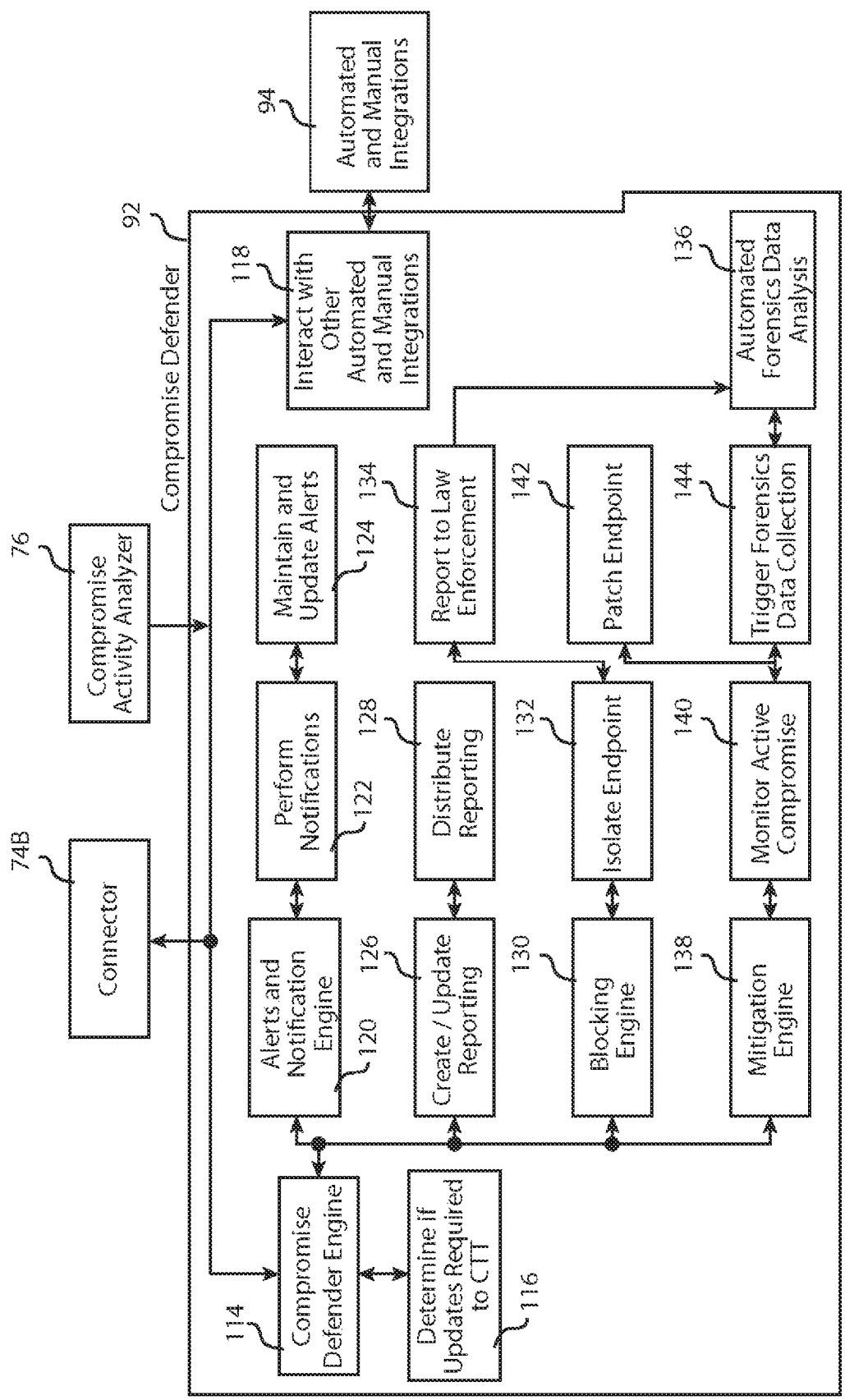
FIG. 5 is a block diagram of an example Compromise Defender of FIG. 4.

FIG. 5 is a block diagram of an example Compromise Defender Module (CDM) 92 of FIG. 4. As noted previously, the Compromise Defender module 92 is coupled to connector 74B, Compromise Activity Analyzer 76 and Automated and Manual Integration module 94. In this example, the Compromise Defender module 92 includes a Compromise Defender Engine module 114, a Determine if Updates Required to CTT module 116, and an Interact with Other Automated and Manual Integrations module 118. These three modules cooperate to coordinate the response to detected compromise activity and to update the device metadata (CTT) if required. The Compromise Defender Engine module 114 also selectively activates an Alerts and Notification Engine module 120, which selectively activates a Perform Notifications module 122, which selectively activates a Maintain and Update Alerts module 124. These three modules provide alerts and notifications to system administrators, device administrators, Information Technology (IT) departments, etc. The Compromise Defender Engine module 114 also selectively activates a Create/Update Reporting module 126, which selectively activates the Distribute Reporting module 128. The Compromise Defender Engine module 114 further selectively activates a Blocking Engine module 130, which selectively activates an Isolate Endpoint module 132, which selectively activates a Report to Law Enforcement module 134, which selectively activates an Automated Forensics Data Analysis module 136. These modules respond to serious breaches of network devices (endpoints) such as servers by isolating the endpoints from attack. Depending upon the sensitivity of the breached endpoint (e.g., a server including classified information), the breach may be automatically reported to law enforcement. The Compromise Defender Engine module 114 also selectively activates a Mitigation Engine 138, which selectively activates a Monitor Active Compromise module 140, which selectively activates a Patch Endpoint module 142 and a Trigger Forensics Data Collection module 144, the latter of which selectively activates the Automated Forensics Data Analysis module 136. In this instance, a network device (endpoint) that is subject to suspicious compromise activity may be "patched," e.g., reassigned a new IP address, to mitigate the issue.

Figure 6:
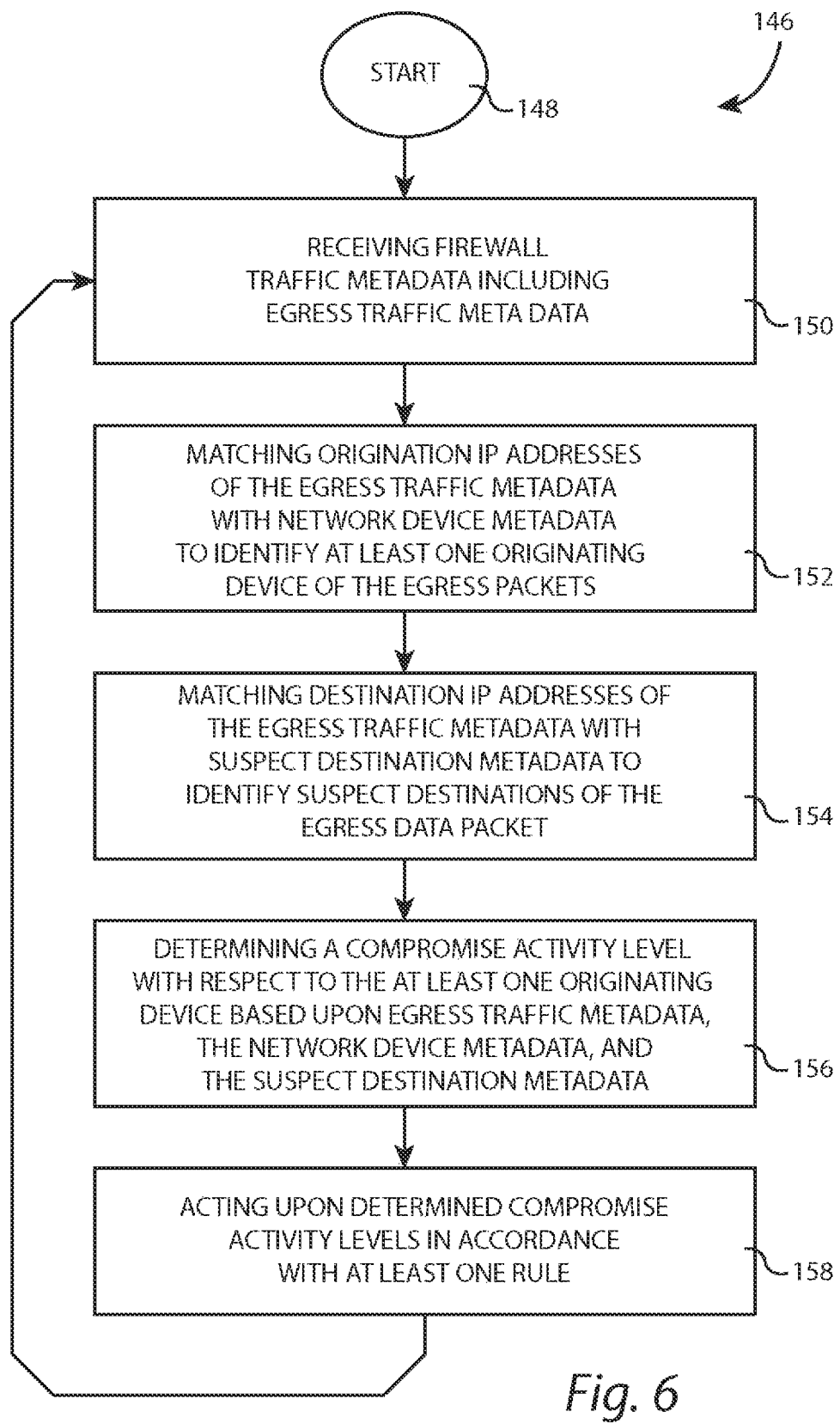
FIG. 6 is a flow diagram of an example process implemented by a compromise activity analyzer.

FIG. 6 is an example process 146 implemented by code segments running on, for example, the compromise activity analyzer 20 of FIG. 2. Process 146 begins at 148 and, in an operation 150, the compromise activity analyzer 20 receives firewall traffic metadata including at least egress traffic metadata with origination Internet Protocol (IP) addresses and destination IP addresses of egress traffic of a firewall. The firewall traffic metadata can be received from a firewall, can be derived from an examination of egress traffic of the firewall, or by any other suitable method. Next, in an operation 152, the compromise activity analyzer 20 matches origination IP addresses of the egress traffic metadata with network device metadata to identify at least one originating device of the egress data packets. The network device metadata can be derived by automated network mapping or can be in the form of a table or the like provided by a network administrator. In an operation 154, the compromise activity analyzer 20 matches destination IP addresses of the egress traffic metadata with suspect destination metadata to identify suspect destinations of the egress data packets. Suspect destination metadata can be derived over time or can be acquired from third part organizations. Next, in an operation 156, the compromise activity analyzer 20 determines a compromise activity level with respect to the at least one originating device based upon egress traffic metadata, the network device metadata, and the suspect destination metadata. The compromise activity level can be scaled, e.g., on a scale of 1-10, or can be labelled as low, medium and high. Finally, in an operation 158, the compromise activity analyzer 20 acts upon determined compromise activity levels in accordance with at least one rule. For example, low compromise activity levels can be ignored, medium compromise activity levels can be reported to an administrator of a network device, and a high activity level can result in automated responses to an immediate threat. Examples of various actions includes blocking, alerting and notifying.

Figure 7:
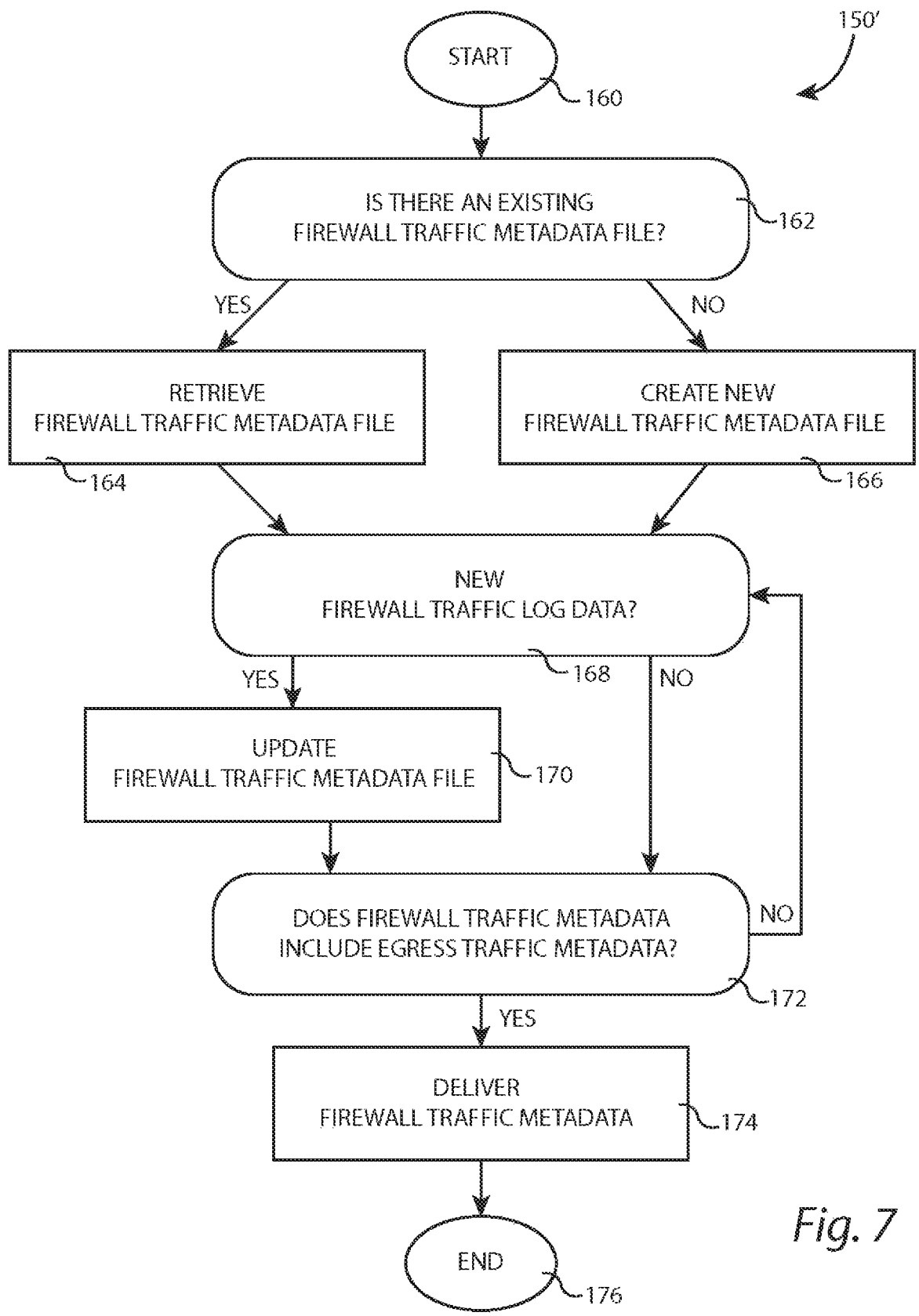
FIG. 7 is a flow diagram of an example process for providing firewall traffic metadata.

FIG. 7 is a flow diagram of an example process 150' for receiving firewall traffic metadata including at least egress traffic metadata of FIG. 6. In this example, process 150' begins at 160 and, in an operation 162, it is determined if there is a current firewall traffic metadata file. If yes, the firewall traffic metadata file is retrieved in an operation 164 and, if not, a new firewall traffic metadata file is created in an operation 166. Next, an operation 168 determines if there is new firewall traffic log data. If so, the firewall traffic metadata file is updated in an operation 170. If not, or after operation 170, the process continues with an operation 172 which determines if the firewall traffic metadata includes egress traffic metadata. If not, process control returns to operation 168 to await new firewall traffic log data. If so, an operation 174 delivers firewall traffic metadata and process 150' ends at 176.

FIG. 8 is an illustration of an example firewall traffic log file 178 including a list 180 and an example firewall traffic metadata file 182 including a table 184. The firewall traffic log list 180 can be, in this non-limiting example, derived from System Logging Protocol (Syslog) messages produced by a firewall. Syslog messages include a timestamp, severity rating, device ID (including IP address), and information specific to the event. Syslog messages are typically sent via User Datagram Protocol (UDP) port 514. UDP is considered to be a connectionless protocol, where messages are not acknowledged or guaranteed to arrive. Syslog messages are often in a human-readable format, but do not need to be. In its header, each Syslog message has a priority level, which is a combination of a code for the process of the device creating the message and a severity level.

With continuing reference to FIG. 8, the example firewall traffic metadata file extracts metadata from the large amount of Syslog data stored in the firewall traffic log 180. For example, table 184 can have rows representing communications between a device on a public network (having a public IP address) and a device on a private network (having a private IP address). Columns of table 184 can include the source and destination IP addresses, port information for the private network device, port information for the public network device, timestamps, flags for egress traffic and ingress traffic, and other relevant factors, in this non-limiting example. It should be noted that egress traffic metadata and ingress traffic metadata can be subsets of the firewall traffic metadata file 182. Alternatively, the egress traffic metadata and ingress traffic metadata can include their own data structures.

FIG. 9 is an example flow diagram 152' of the matching origination IP addresses of the egress traffic metadata with network device metadata operation 152 of FIG. 6. Example process 152' begins at 186 and, in an operation 188, origination IP addresses of egress traffic from the firewall is extracted from the firewall traffic metadata. Next, in an operation 190, the extracted origination IP addresses are matched against network device metadata to identify the originating devices. Process 152' then ends at 192.

FIG. 10 is an example network device metadata file structure 194, hereafter referred to as a Compromise Translation Table (CTT) 194. In this non-limiting example, CTT 194 is a table having rows for various private network devices and columns for various attributes of those private network devices. Examples of private network devices include servers, computers, routers, peripherals, etc. In this example, the attributes of the network devices provided by columns of the CTT include the IP address(es), Media Access Control (MAC) address(es), a human-readable name, function(s), vulnerabilities, users, groups and other attributes of the network devices. The CTT 194 can be partially populated automatically, e.g., using a network mapper, but is preferably augmented manually by the system administrator for the private network via a suitable user interface.

Figure 11:
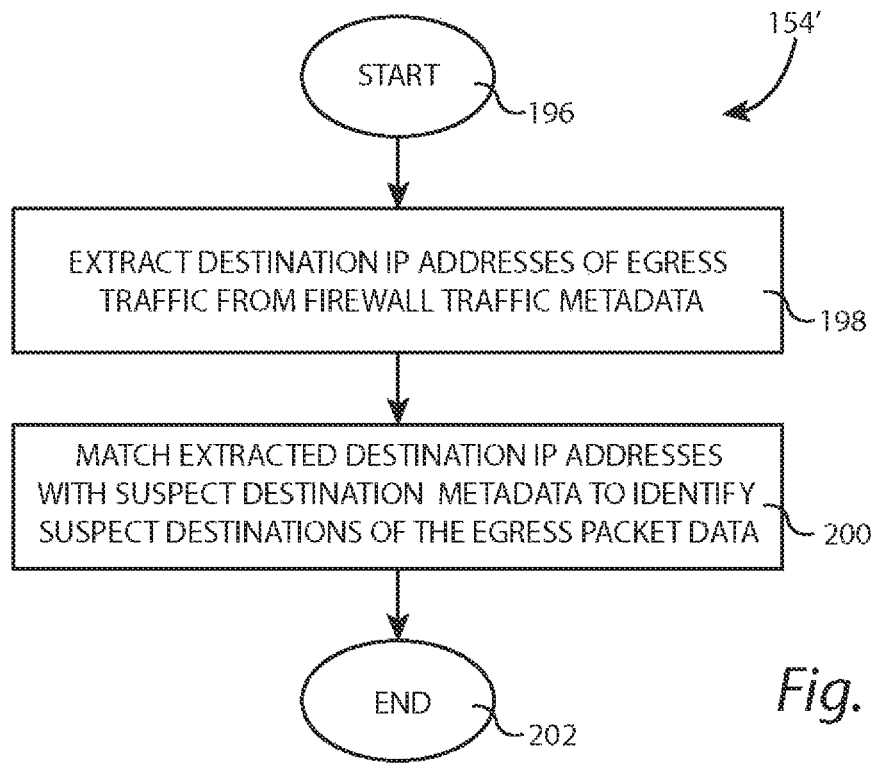
FIG. 11 is an example flow diagram of a process for matching destination IP addresses with suspect destination metadata.

FIG. 11 is an example flow diagram 154' of the matching destination IP addresses of the egress traffic metadata with suspect destination metadata to identify suspect destinations of the egress data packets operation 154 of FIG. 6. Example process 154' begins at 196 and, in an operation 198, destination IP addresses of egress traffic is extracted from the firewall traffic metadata. Next, in an operation 200, the extracted destination IP addresses are matched with suspect destination metadata to identify suspect destinations of the egresses packet data. Process 154' then ends at 202.

Figure 12:
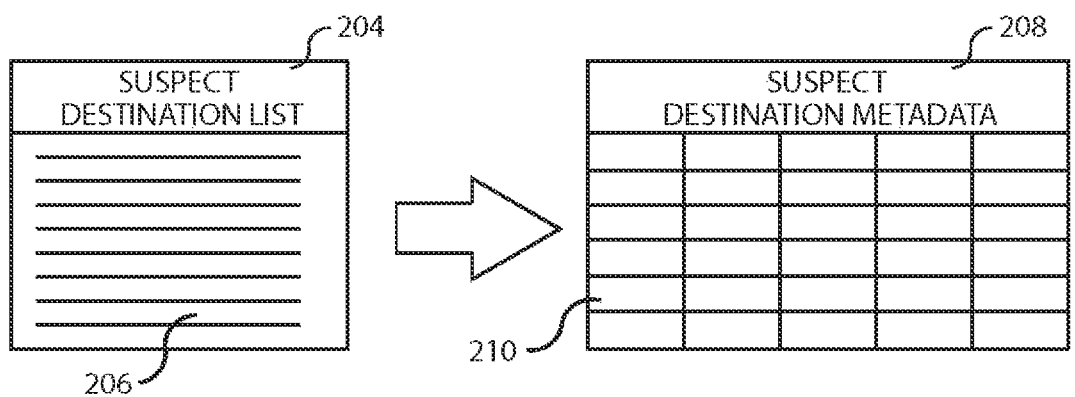
FIG. 12 is an illustration of example suspect destination list and suspect destination metadata table.

FIG. 12 is an illustration of an example suspect destination file 204 including a list 206 of suspect IP addresses, and of an example suspect destination metadata file 208 including a table 210. The list 206 of the suspect destination file may be static or dynamic and can be populated with commercially available lists, manually, heuristically, etc. Jn this non-limiting example, the table 210 of the suspect destination metadata file 208 can be populated, at least in part, from the suspect destination list 206 and augmented with additional metadata including IP ranges, threat type, severity, etc.

FIG. 13 is an illustration of an example methodology 156' for determining a compromise activity level of operation 156 of FIG. 6. The methodology 156' includes a Host Sensitivity Multiplier table 212, a Destination Host Score Factor table 214, a Port Criticality Factor table 216, a Communications of Concern table 218, a Factor/Value/Result table 220, an example score parameters 222 and example adjusted compromise concern calculation 224. In this example, the example score parameters had a minimum score of 23.75 and a maximum score 123.75, which is then normalized to a scale of 1 to 100. The adjusted compromise concern calculation 224 uses two scales against a Fibonacci sequence to determine an adjustment for count of communications and data volume. The maximum of the Count Adjustment and the Data Volume Adjustment is then used with a weighted average to calculate a compromise concern value (CCV) between 1 and 100. A compromise activity level (CAL) can be derived from the CCV using one or more rules. For example, the CAL can be assigned the value LOW for 1≤CCV<20, MEDIUM for 20≤CCV<80, and HIGH for 80≤CCV≤100.

FIG. 14 is an illustration of a network port metadata file 226 including a table 228 including metadata concerning the one or more private network ports of the firewall. It will be noted that the methodology of FIG. 13 includes a port criticality factor 216. Egress traffic to suspect destinations sourced from private network ports 3389, 1433, 1521, 1531, 1541, 3306, etc. all factor into the compromise activity level concerns. For example, private network port 3389 is used for remote access by Windows RDP and others. It will therefore be appreciated that network port metadata file 226, in this example, has a port table 228 including such entries as port number, common port usage (e.g., remote access, database access, etc.), and criticality.

Figure 15:
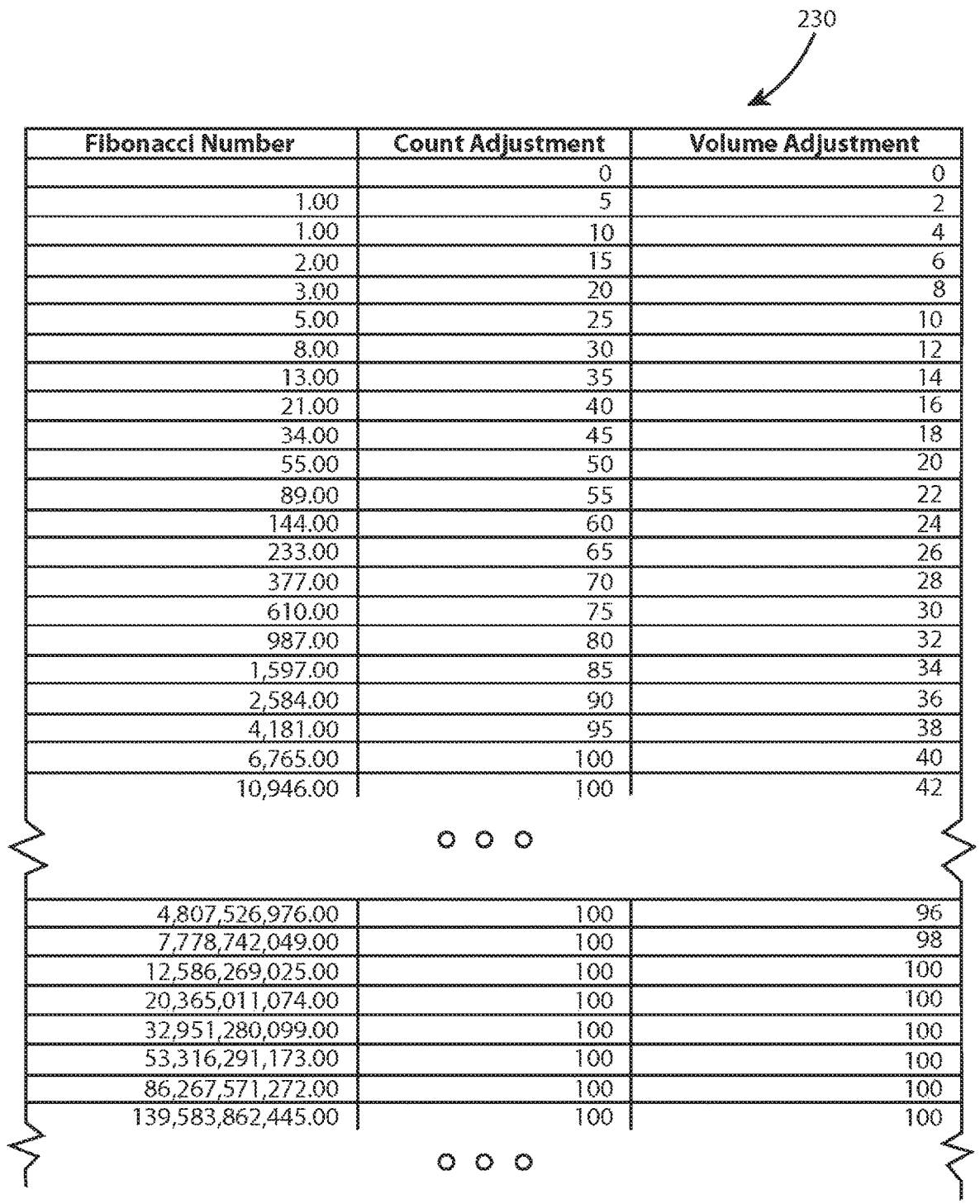
FIG. 15 is a table with a Fibonacci sequence and associated count and volume adjustment values.

FIG. 15 is a table 230 with a Fibonacci sequence and associated count adjustment and volume adjustment columns. In this non-limiting example, the count adjustment increases by 5 and the volume adjustment increases by 2 for each number in the Fibonacci sequence. At Fibonacci number 6,765 the count adjustment becomes fixed at 100, and at Fibonacci number 12,586,269,025 the volume adjust becomes fixed at 100.

With further reference to FIGS. 13-15, the general approach to determining a compromise concern score is as follows:
1. Start with a score of 50 as a default.
2. Use the Host Sensitivity Multiplier to adjust the score by 25% or 50%
3. Use the Destination Host Threat Score to adjust the number up or down by 50%
4. Apply a factoring based on the criticality of the port.
5. In this example, this results in a number between 23.75 and 123.75. Normalize the number to a scale of 1 to 100.
6. Use the count of communications and the volume of communications to adjust the score on a weighted average as follows:
   a. Weight count and data volume with a Fibonacci sequence, where count adjustments increment by 5, and data volume adjustments increment by 2 against the sequence, as seen in FIG. 15; and
   b. Use the maximum of these scores with a 2× weighted average against the Normalized Score to calculate the Compromise Concern Score (CCS)

Figure 16:
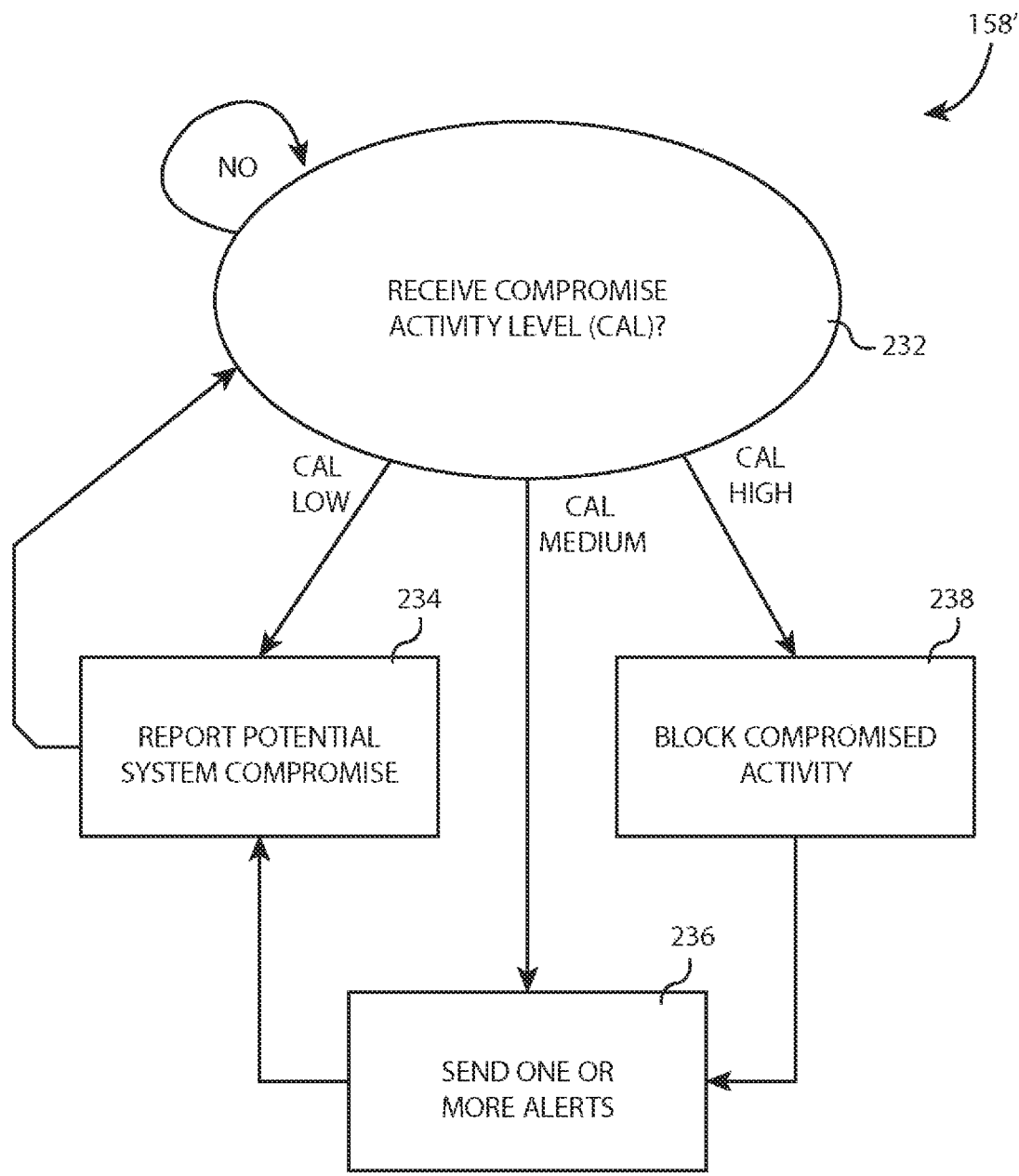
FIG. 16 is an example flow diagram of a process for acting upon determined compromise activity levels in accordance with at least one rule.

FIG. 16 is an example flow diagram 158' of the acting upon determined compromise activity levels in accordance with at least one rule operation 158 of FIG. 6. Process 158' idles in an operation 232 until a compromise concern score (CCS) is received. If the CCS is LOW, an operation 234 reports one or more potential system compromises before returning to operation 232. Since the CCS is LOW, the reports can be regular, scheduled reports to, for example, a system administrator. If the CCS is MEDIUM, one or more alerts are sent by operation 236. These alerts are of higher urgency can be sent out immediately to one or more system managers, such as a database server manager or a group manager. Process control can then go to operation 234 for a more extensive report or can return directly to the idle operation 232. If the CCS is HIGH, an operation 238 can automatically block the compromised activity, e.g., blocking a malicious device on the public network at the firewall or isolating a device on the private network that is infected with malware. Process control can then go to operation 236 to send one or more alerts and to operation 234 to send one or more report, or process control can return directly to the idling operation 232. It will be appreciated that the action(s) undertaken are subject to one or more rules, e.g., always notify, sometimes alert, but only block under extreme threat conditions.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A network compromise activity monitoring system comprising:
   A hardware or virtual network connector including a digital processor, the network connector having a public network port, at least one private network port, and an associated network connector traffic log concerning data packet traffic of the network connector, including at least egress traffic metadata including origin IP addresses of egress traffic, whereby data packets flowing into the at least one private network port and out of the public network port are egress traffic and wherein data packets flowing into the public network port and out of the at least one private network port are ingress traffic;
   a digital logic compromise activity analyzer including a processor and memory, the digital logic compromise activity analyzer being receptive to the egress traffic metadata of the network connector traffic log and having access to suspect destination metadata, and network device metadata including a Compromise Translation Table (CTT), the digital logic compromise activity analyzer being operative to determine a compromise activity level of one or more devices coupled to the at least one private network port, based at least in part, upon the suspect destination metadata, the egress traffic metadata, and the network device metadata, including extracting the origin IP addresses from the egress traffic metadata and matching the extracted origin IP addresses with the CTT to identify originating network devices to, at least in part, determine the compromise activity level of the one or more devices coupled to the at least one private network port; and
   a digital logic compromise defender module including a processor and memory responsive to the determined compromise activity level of the one or more devices and operative to at least one of block, alert and notify in accordance with at least one rule.

2. The network compromise activity monitoring system as recited in claim 1 wherein the digital logic compromise activity analyzer also has access to ingress traffic metadata, whereby the ingress traffic metadata is used, at least in part, to determine the compromise activity level of the one or more devices.

3. The network compromise activity monitoring system as recited in claim 2 wherein the egress traffic metadata and the ingress traffic metadata are derived from the network connector traffic log.

4. The network compromise activity monitoring system as recited in claim 3 wherein the digital logic compromise activity analyzer also has access to private network port metadata concerning the at least one private network port, whereby the private network port metadata is used, at least in part, to determine the compromise activity level of the at least one of the plurality of devices.

5. The network compromise activity monitoring system as recited in claim 3 wherein the compromise defender module is a part of the digital logic compromise activity analyzer.

6. The network compromise activity monitoring system as recited in claim 5 wherein the digital logic compromise activity analyzer is part of the network connector.

7. The network compromise activity monitoring system as recited in claim 3 wherein the network connector is one of a firewall and a router.

8. A network device compromise activity analyzer comprising:
    a processor;
    memory coupled to the processor including code segments executable on the processor for
    (a) retrieving firewall traffic metadata including at least egress traffic metadata having origination Internet Protocol (IP) addresses and destination IP addresses of egress traffic of a firewall;
    (b) matching origination IP addresses of the egress traffic metadata with network device metadata including a Compromise Translation Table (CTT) to identify at least one originating device of the egress data packets;
    (c) matching destination IP addresses of the egress traffic metadata with suspect destination metadata to identify suspect destinations of the egress data packets;
    (d) determining a compromise activity level with respect to the at least one originating device based upon the egress traffic metadata, the network device metadata, and the suspect destination metadata; and
    (e) acting upon determined compromise activity levels in accordance with at least one rule.

9. The network device compromise activity analyzer as recited in claim 8 wherein determining a compromise activity level is further based upon private network port metadata.

10. The network device compromise activity analyzer as recited in claim 9 wherein the private network port metadata concerns one or more private ports of the firewall.

11. The network device compromise activity analyzer as recited in claim 8 wherein acting upon determined compromise activity levels in accordance with at least one rule includes at least one of blocking, alerting, and notifying.

12. The network device compromise activity analyzer as recited in claim 8 wherein the network device metadata includes an IP address and a device type for each device.

13. The network device compromise activity analyzer as recited in claim 12 wherein the network device metadata further includes one or more of a MAC address, a technical name, an organization name, and a department name.

14. The network device compromise activity analyzer as recited in claim 8 wherein matching origination IP addresses of the egress traffic metadata with network device metadata to identify at least one originating device of the egress data packets comprises:
    creating a list of one or more origination IP addresses of the egress traffic metadata; and
    using the list of one or more origination IP addresses to search the CTT.

15. The network device compromise activity analyzer as recited in claim 8 wherein the suspect destination metadata is stored in a content-searchable format.

16. The network device compromise activity analyzer as recited in claim 8 wherein matching destination IP addresses of the egress traffic metadata with suspect destination metadata to identify suspect destinations of the egress data packets comprises:
    creating a list of one or more destination IP addresses of the egress traffic metadata; and
    using the list of one or more destination IP addresses to query the suspect destination metadata for the suspect threat metadata.

17. The network device compromise activity analyzer as recited in claim 8 wherein the egress traffic metadata is analyzed for data rate of egress traffic to a destination IP address.

18. The network device compromise activity analyzer as recited in claim 8 wherein the egress traffic metadata is analyzed for contact or call back activity to a device IP address by a destination IP address.

19. The network device compromise activity analyzer as recited in claim 18 wherein the egress traffic metadata is analyzed for contact or call back activity to a plurality of device IP addresses by a destination IP address.

20. A computer-implemented method for monitoring compromise activity of a network device comprising:
    providing firewall traffic metadata to a compromise activity analyzer including a digital processor and memory, wherein the firewall traffic metadata includes at least egress traffic metadata having origination Internet Protocol (IP) addresses and destination IP addresses of egress traffic of the firewall;
    matching origination IP addresses of the egress traffic metadata with network device metadata including a Compromise Translation Table (CTT) to identify at least one originating device of the egress data packets;
    matching destination IP addresses of the egress traffic metadata with suspect destination metadata;
    determining a compromise activity level to the at least one originating device based upon egress traffic metadata, the network device metadata and the suspect destination metadata; and
    acting upon determined compromise activity levels in accordance with at least one rule.

21. The computer-implemented method for monitoring compromise activity of a network device as recited in claim 20 wherein the egress traffic metadata is analyzed for data rates above a given threshold.

22. The computer-implemented method for monitoring compromise activity of a network device as recited in claim 20 wherein the egress traffic metadata is analyzed for at least one of frequency of egress traffic and patterns of egress traffic.

23. The computer-implemented method for monitoring compromise activity of a network device as recited in claim 20 wherein the network device metadata is analyzed for the importance of the device.

24. The computer-implemented method for monitoring compromise activity of a network device as recited in claim 20 wherein the suspect destination metadata is analyzed for threat severity.

25. A non-transitory computer readable media including code segments executable on a digital processor for monitoring compromise activity of a network device comprising:

code segments providing firewall traffic metadata including at least egress traffic metadata with origination Internet Protocol (IP) addresses and destination IP addresses of egress traffic of a firewall;

code segments matching origination IP addresses of the egress traffic metadata with network device metadata including a Compromise Translation Table (CTT) to identify at least one originating device of the egress data packets;

code segments determining a compromise activity level to the at least one originating device based upon egress traffic metadata and the network device metadata; and code segments acting upon determined compromise activity levels in accordance with at least one rule.

26. The non-transitory computer readable media including code segments executable on a digital processor for monitoring compromise activity of a network device as recited in claim 25 wherein the egress traffic metadata is analyzed for data rates above a given threshold.

27. The non-transitory computer readable media including code segments executable on a digital processor for monitoring compromise activity of a network device as recited in claim 25 wherein the egress traffic metadata is analyzed for at least one of frequency of egress traffic and patterns of egress traffic.

28. The non-transitory computer readable media including code segments executable on a digital processor for monitoring compromise activity of a network device as recited in claim 25 wherein the network device metadata is analyzed for the importance of the device.

29. The non-transitory computer readable media including code segments executable on a digital processor for monitoring compromise activity of a network device as recited in claim 25 wherein the suspect destination metadata is analyzed for threat severity.

* * * * *